(12) United States Patent
Ricketts et al.

(10) Patent No.: US 10,232,677 B2
(45) Date of Patent: Mar. 19, 2019

(54) SYSTEM AND METHOD FOR PLACING AN ACTIVE SUSPENSION SYSTEM IN A DEMONSTRATION MODE

(71) Applicant: Honda Motor Co., Ltd., Tokyo (JP)

(72) Inventors: Brandon E. Ricketts, Marysville, OH (US); Dirk G. Westendorf, Marysville, OH (US); Jason A. Sovern, Marysville, OH (US); Seth A. Ritchie, Marysville, OH (US); Takumi Makabe, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/679,899

(22) Filed: Aug. 17, 2017

(65) Prior Publication Data

US 2019/0054789 A1 Feb. 21, 2019

(51) Int. Cl.
*B60W 10/22* (2006.01)
*B60G 17/015* (2006.01)
*B60G 17/018* (2006.01)

(52) U.S. Cl.
CPC ......... *B60G 17/015* (2013.01); *B60G 17/018* (2013.01); *B60W 10/22* (2013.01); *B60G 2400/252* (2013.01); *B60G 2500/10* (2013.01)

(58) Field of Classification Search
CPC ............... B60G 17/015; B60G 17/018; B60G 2400/252; B60G 2500/10; B60W 10/22
See application file for complete search history.

(56) References Cited

U.S. PATENT DOCUMENTS

| | | | |
|---|---|---|---|
| 5,555,173 A * | 9/1996 | Campbell | B60G 17/016 280/5.504 |
| 9,174,508 B2 | 11/2015 | Anderson et al. | |
| 9,205,717 B2 | 12/2015 | Brady et al. | |
| 9,349,304 B2 | 5/2016 | Sangermano, II et al. | |
| 9,527,362 B2 | 12/2016 | Brady et al. | |
| 9,662,954 B2 | 5/2017 | Brady et al. | |
| 2012/0245795 A1* | 9/2012 | Matsuzaki | B60G 9/02 701/38 |
| 2014/0117883 A1* | 5/2014 | Selden | B60N 2/501 318/9 |
| 2014/0125018 A1 | 5/2014 | Brady et al. | |
| 2016/0288785 A1* | 10/2016 | Ezoe | B60W 30/18145 |

FOREIGN PATENT DOCUMENTS

EP 1462972 A1 9/2004

* cited by examiner

*Primary Examiner* — Hussein Elchanti
(74) *Attorney, Agent, or Firm* — Honda Patents & Technologies North America, LLC; Mark E. Duell

(57) ABSTRACT

System and method for operating an active suspension system of a vehicle includes actuating a switch on the vehicle, setting the active suspension system for the vehicle to a demonstration mode, setting a timer when the active suspension system is set to the demonstration mode, and setting the active suspension system for the vehicle to a normal operating mode after the timer reaches a predetermined time. Prior to expiration of the timer, the system and method determines a gear in which the vehicle is placed, determines whether an engine of the vehicle is running if the transmission gear of the vehicle is drive, reverse, or neutral, and determines a throttle angle of the vehicle if the engine is running. The active suspension system is set to a normal operating mode if the throttle angle is greater than a predetermined angle. An iterative process determines the status of the timer.

20 Claims, 2 Drawing Sheets

SYSTEM AND METHOD FOR PLACING AN ACTIVE SUSPENSION SYSTEM IN A DEMONSTRATION MODE

TECHNICAL FIELD

The embodiments described herein are related to the suspension systems for vehicles, and more specifically modes for an active or adaptive suspension system.

BACKGROUND

Vehicles, such as a side-by-side utility vehicle ("SxS"), may include an active or adaptive suspension system for providing a smooth ride to a user. Active suspensions and adaptive suspensions or semi-active suspensions (herein described collectively as an "active suspension system") are types of suspensions that control the vertical movement of the wheels of the vehicle relative to a chassis or a body of the vehicle with an onboard system. This differs from passive suspensions where the movement is determined entirely by the road surface.

The active suspension system may include dampers to control the vertical movement of the wheels. The dampers are may be electrically actuated hydraulic dampers controlled by servomotors, solenoid-actuated hydraulic dampers, magnetorheological dampers, or any other type of dampers known to those skilled in the art. Sensors continually monitor body movement and vehicle ride level, constantly supplying an electronic control unit ("ECU") that controls the active suspension system with new data. As the ECU receives and processes data, it operates the dampers mounted beside each wheel. Almost instantly, the dampers generate counter forces to body lean, dive, and squat during driving maneuvers. However, the active suspension system and the effects of the active suspension system may not be visible to a potential customer. Therefore, there is established a need to provide a demonstration mode to illustrate the effects of the active suspension system.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a method for operating an active suspension system for a vehicle includes the steps of actuating a switch on the vehicle, setting the active suspension system for the vehicle to a demonstration mode, setting a timer when the active suspension system is set to the demonstration mode, and setting the active suspension system for the vehicle to a normal operating mode after the timer reaches a predetermined time.

According to another aspect, a method for operating an active suspension system for a vehicle includes the steps of actuating a switch on the vehicle, setting the active suspension system for the vehicle to a demonstration mode, setting a timer when the active suspension system is set to the demonstration mode and setting the active suspension system for the vehicle to a normal operating mode after the timer reaches a predetermined time, determining a gear in which a transmission of the vehicle is placed and setting the active suspension system for the vehicle to a normal operating mode if the transmission gear of the vehicle is drive, reverse, or neutral, determining whether an engine of the vehicle is running if the transmission gear of the vehicle is drive, reverse, or neutral and setting the active suspension system for the vehicle to a normal operating mode if the engine is running, determining a throttle angle of the vehicle if the engine is running and setting the active suspension system to a normal operating mode if the throttle angle is greater than a predetermined angle, and determining a status of the timer.

According to yet another aspect, a system for operating an active suspension system for a vehicle includes a switch on the vehicle for setting the active suspension system for the vehicle to a demonstration mode, a timer set when the active suspension system is set to the demonstration mode, and wherein the active suspension system for the vehicle is set to a normal operating mode after the timer reaches a predetermined time.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
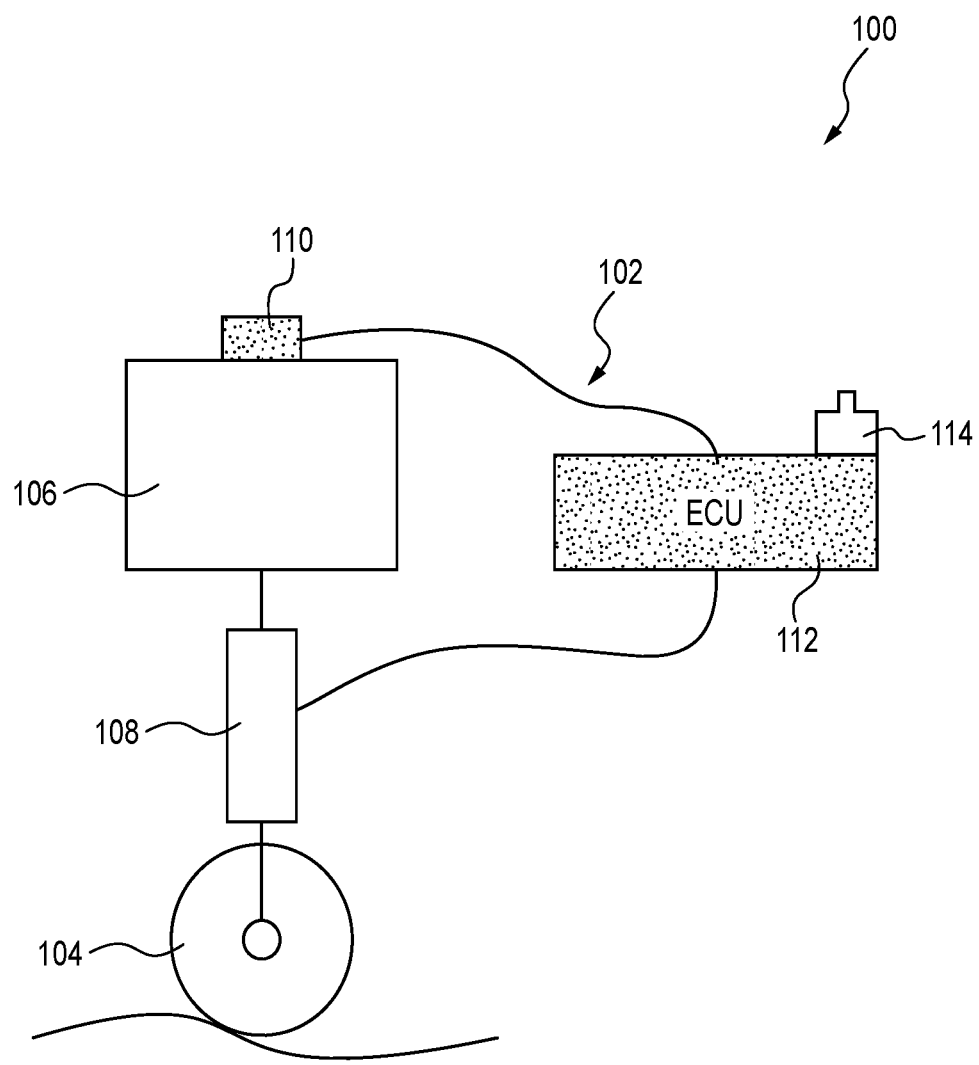
FIG. 1 is a schematic view of a vehicle with an active suspension system.

FIG. 1 schematically illustrates an active suspension system 102 for providing a smooth ride to a user of a vehicle 100, such as a side-by-side utility vehicle ("SxS"). Active suspensions and adaptive suspensions or semi-active suspensions (herein described collectively as an "active suspension system") are types of suspensions that control the vertical movement of the wheels 104 of the vehicle relative to a chassis or a body 106 of the vehicle 100 with an onboard system. This differs from passive suspensions where the movement is determined entirely by the road surface.

The active suspension system 102 may include dampers 108 to control the vertical movement of the wheels 104. The dampers 108 may be electrically actuated hydraulic dampers controlled by servomotors, solenoid-actuated hydraulic dampers, magnetorheological dampers, or any other type of dampers known to those skilled in the art. In a normal operation mode, sensors 110 continually monitor body 106 movement and vehicle 100 ride level, constantly supplying an electronic control unit ("ECU") 112 that controls the active suspension system 102 with new data. As the ECU 112 receives and processes data, it operates the dampers 108 mounted beside each wheel 104. Almost instantly, the dampers 108 generates counter forces to body 106 lean, dive, and squat during driving maneuvers.

For a vehicle 100, such as an SxS, the operation of the active suspension system 102 is difficult to illustrate to customers. Therefore, there is a need for two modes of operation of the vehicle, the normal operation mode when the vehicle 100 is in an operating state, and a demonstration mode to illustrate the practical effects of the active suspension system 102. The normal operation mode is a mode in which all sensors 110 continue to operate and report data to the ECU 112, and the ECU 112 in turn controls the active suspension system 102. The demonstration mode is a mode in which the sensors 110 of the active suspension system 102 are operated minimally, and the dampers 108 are set to a full soft condition in which the dampers 108 provide free movement of the body 106 relative to the wheels 104. The customer or owner of the vehicle 100 can shake the vehicle 100 and feel the change in the active suspension system 102 to help them understand the full adjustment capability of the active suspension system 102.

The active suspension system 102 may be placed into demonstration mode in any method known to one skilled in the art. In the embodiment illustrated in FIG. 1, a switch 114 is in electrical communication with the ECU 112. The switch 114 sets the active suspension system 102 to normal operation mode when normally actuated. However, when the switch 114 is held in the actuation position for a predetermined amount of time, such as for 3.0 seconds, the ECU 112 switches the active suspension system 102 to the demonstration mode. The active suspension system 102 may be returned to normal operation mode by actuating the switch 114, or the active suspension system 102 may be returned to normal operation mode by the method 200 illustrated in FIG. 2 and described below.

Figure 2:
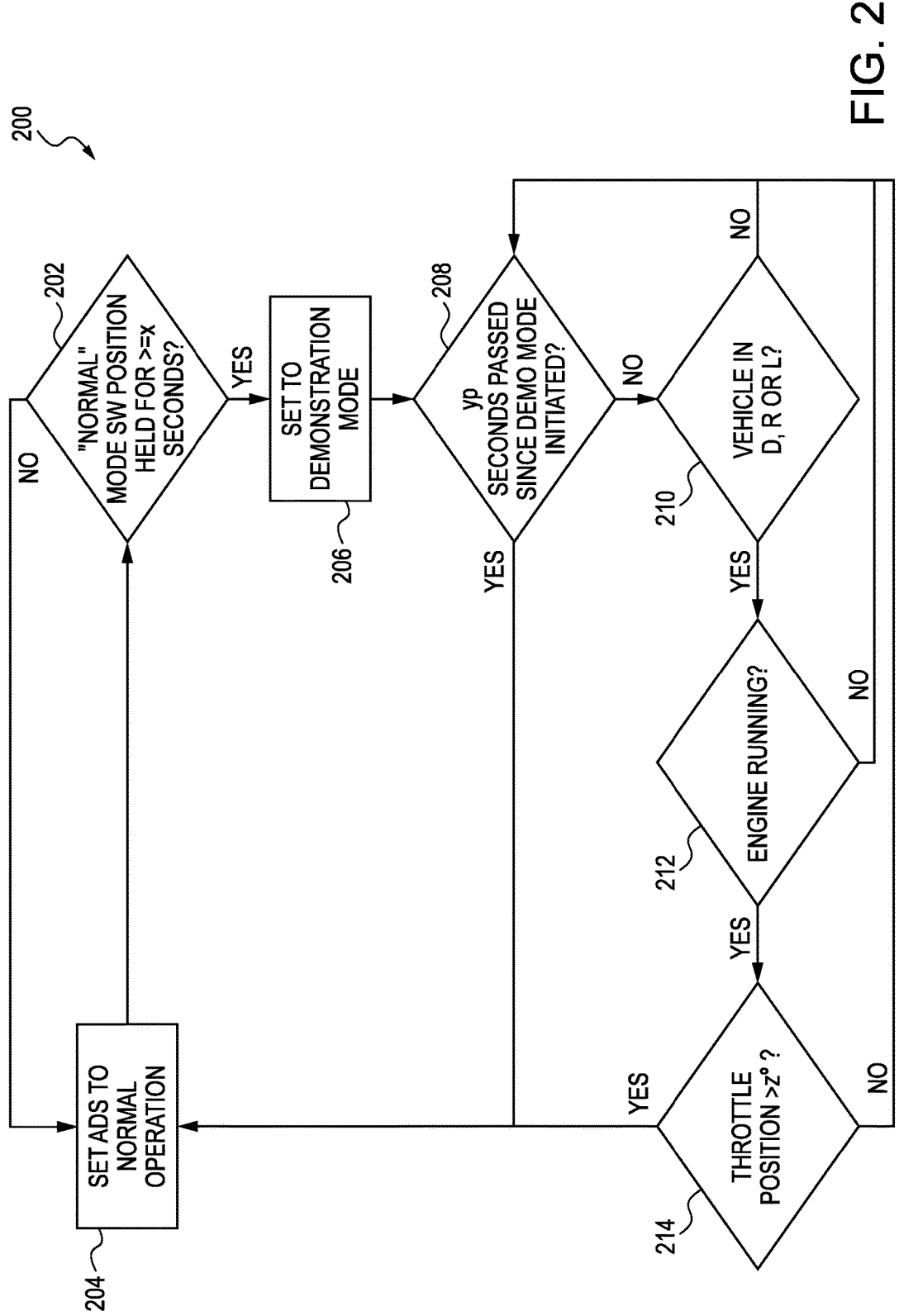
FIG. 2 is a flowchart depicting a method of selecting between a normal operating mode and a demonstration mode of the active suspension system of FIG. 1.

FIG. 2 is a flow chart illustrating operation of the active suspension system 102 and the method 200 of selecting between operating modes. The first step 202 is to actuate the switch 114 of the vehicle 100. If the switch 114 is actuated for less than a predetermined number x of seconds, such as 3.0 seconds in the illustrated embodiment, the method moves to step 204, which instructs the ECU 112 to put the active suspension system 102 in the normal operation mode. If, in step 202, the switch 114 is actuated for at least a predetermined number x of seconds, such as 3.0 seconds in the illustrated embodiment, the method moves to step 206. In step 206, the ECU 112 places the active suspension system 102 into demonstration mode, in which each damper 108 of the vehicle 100 is set to a full soft condition. The customer or owner of the vehicle 100 can shake the vehicle 100 and feel the change in the active suspension system 102 to help them understand the full adjustment capability of the active suspension system 102.

Upon entering the demonstration mode in step 206, the method 200 moves to step 208 in which the ECU 112 begins a timer calculating a time, such as a number y of seconds, that the active suspension system 102 has been in demonstration mode. If the number y of seconds reaches a predetermined time $y_p$ in seconds, such as 180 seconds, the method 200 returns to step 204, and the ECU 112 returns the active suspension system 102 to normal operation mode, and the method 200 ends until the next time the switch 114 is actuated.

If the timer has not yet reached the predetermined time $y_p$, the method 200 moves to step 210, in which the ECU 112 checks to determine if the vehicle 100 is in drive, reverse, or neutral gear. If the vehicle 100 is not in drive, reverse, or neutral gear, the method 200 returns to step 208 to check the timer in the ECU 112. If the vehicle 100 is found to be in drive, reverse, or neutral gear, then the method 200 moves to step 212.

In step 212, the ECU 112 checks an engine sensor to determine if an engine associated with the vehicle 100 is running. If the engine is not running, then the method 200 returns to step 208 to check the timer in the ECU 112. If the engine is found to be running, the method moves to step 214.

In step 214, the ECU 112 determines a throttle angle of the vehicle 100. The throttle angle, in which an increasing positive value indicates an increase of fuel introduced to the engine (not shown) of the vehicle 100, may be determined by a sensor on the gas pedal or by any other method known to one skilled in the art. If the throttle angle is greater than a predetermined angle of z°, such as ZZ° (preferred value or range) signifying the user indicating a desire to move, the active suspension system is set to the normal operating mode in step 204. If the throttle angle is less than a predetermined angle z°, then the method returns to step 208, and the timer is checked.

Each time the method 200 enters step 208, and a condition to set a normal operating mode at stop 204 is not met, the method 200 then repeats in an iterative process between steps 208 and 214 until such time as the timer reaches $y_p$ seconds in step 208, or the conditions of steps 210, 212, and 214 are met. The method may be repeat at a cycle of between XX and YY (preferred cycle frequency) hertz. Additionally, the method may be completed if a user actuates the switch 114 as indicated in step 202.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method for operating an active suspension system for a vehicle, comprising the steps of:
   actuating a switch on the vehicle;
   setting the active suspension system for the vehicle to a demonstration mode;
   setting a timer when the active suspension system is set to the demonstration mode; and
   setting the active suspension system for the vehicle to a normal operating mode after the timer reaches a predetermined time.

2. The method of claim 1 further comprising the step of:
   determining a gear in which a transmission of the vehicle is placed.

3. The method of claim 2 further comprising the step of:
   setting the active suspension system for the vehicle to a normal operating mode if the transmission gear of the vehicle is drive, reverse, or neutral.

4. The method of claim 2 further comprising the step of:
   determining whether an engine of the vehicle is running if the transmission gear of the vehicle is drive, reverse, or neutral.

5. The method of claim 4 further comprising the step of:
setting the active suspension system for the vehicle to a normal operating mode if the engine is running.

6. The method of claim 4 further comprising the step of:
determining a throttle angle of the vehicle if the engine is running.

7. The method of claim 6 further comprising the step of:
setting the active suspension system to a normal operating mode if the throttle angle is greater than a predetermined angle.

8. The method of claim 7 further comprising the step of:
determining a status of the timer.

9. The method of claim 8 further comprising the step of:
setting the active suspension system to the normal operating mode if the timer reaches a predetermined amount of time.

10. A method for operating an active suspension system for a vehicle, comprising the steps of:
actuating a switch on the vehicle;
setting the active suspension system for the vehicle to a demonstration mode;
setting a timer when the active suspension system is set to the demonstration mode and setting the active suspension system for the vehicle to a normal operating mode after the timer reaches a predetermined time;
determining a gear in which a transmission of the vehicle is placed and setting the active suspension system for the vehicle to a normal operating mode if the transmission gear of the vehicle is drive, reverse, or neutral;
determining whether an engine of the vehicle is running if the transmission gear of the vehicle is drive, reverse, or neutral and setting the active suspension system for the vehicle to a normal operating mode if the engine is running;
determining a throttle angle of the vehicle if the engine is running and setting the active suspension system to a normal operating mode if the throttle angle is greater than a predetermined angle; and
determining a status of the timer.

11. The method of claim 10 further comprising the step of:
setting the active suspension system to the normal operating mode if the timer reaches a predetermined amount of time.

12. A system for operating an active suspension system for a vehicle, comprising:
an electronic control unit for controlling the active suspension system;
a switch on the vehicle in electrical communication with the electronic control unit for setting the active suspension system for the vehicle to a demonstration mode;
a timer in the electronic control unit set when the active suspension system is set to the demonstration mode; and
wherein the active suspension system for the vehicle is set to a normal operating mode after the timer reaches a predetermined time.

13. The system of claim 12 further comprising:
a sensor in electrical communication with the electrical control unit for determining a gear in which a transmission of the vehicle is placed.

14. The system of claim 13 wherein the active suspension system for the vehicle is set to a normal operating mode if the transmission gear of the vehicle is drive, reverse, or neutral.

15. The system of claim 13 further comprising:
a sensor in electrical communication with the electrical control unit for determining whether an engine of the vehicle is running if the transmission gear of the vehicle is drive, reverse, or neutral.

16. The system of claim 15 wherein the active suspension system for the vehicle is set to a normal operating mode if the engine is running.

17. The system of claim 15 further comprising:
a sensor in electrical communication with the electrical control unit for determining a throttle angle of the vehicle if the engine is running.

18. The system of claim 17 wherein the active suspension system is set to a normal operating mode if the throttle angle is greater than a predetermined angle.

19. The system of claim 17 wherein the status of the timer is determined if the active suspension system remains in the demonstration mode.

20. The system of claim 19 wherein the active suspension system is set to the normal operating mode if the timer reaches a predetermined amount of time.

* * * * *